Feb. 20, 1934.  V. R. WEAST  1,947,687
APPARATUS FOR MAKING COFFEE
Filed March 10, 1932
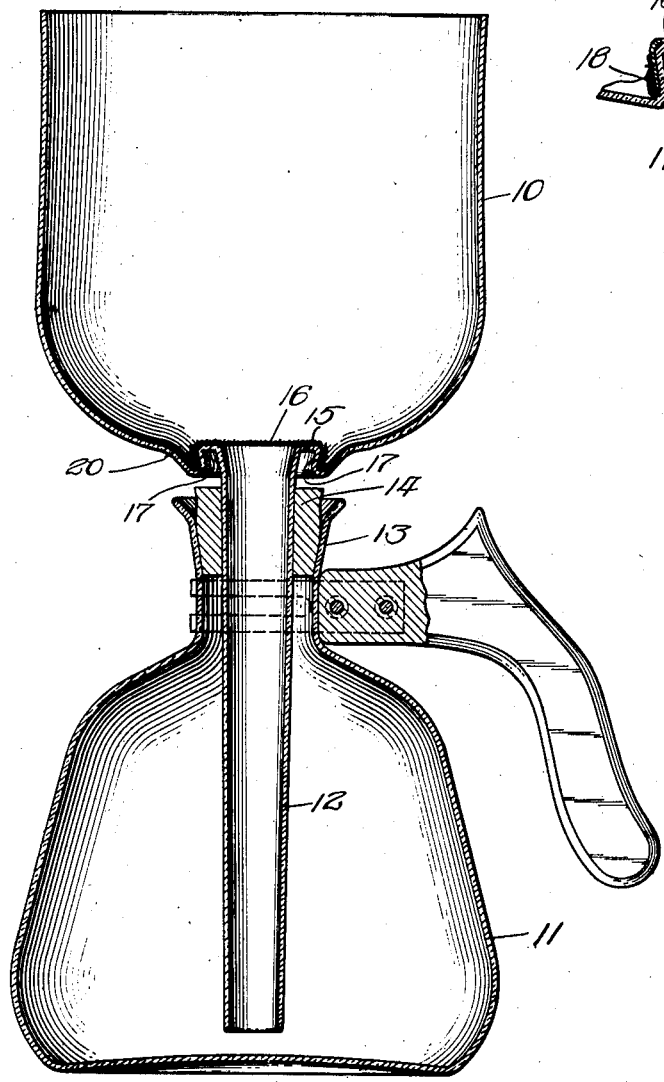
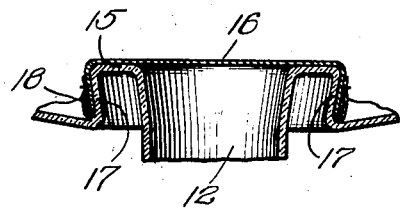
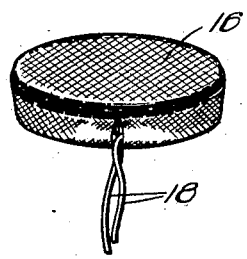
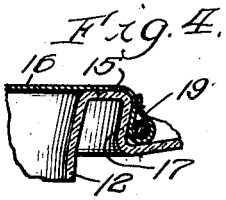
Inventor:
VICTOR R. WEAST
By Jones, Addington,
Ames & Seibold Attys.

Patented Feb. 20, 1934

1,947,687

UNITED STATES PATENT OFFICE 1,947,687

APPARATUS FOR MAKING COFFEE

Victor R. Weast, Chicago, Ill.

Application March 10, 1932. Serial No. 597,907

3 Claims. (Cl. 53—3)

This invention relates to an apparatus for making coffee and has special reference to an apparatus for creating a differential pressure between two receptacles whereby liquid is forced from one to the other to become infused with coffee in the latter and is subsequently filtered back into the former.

More particularly, this invention relates to an apparatus comprising a siphon tube preferably formed integrally with an upper receptacle for communication with a lower receptacle, the upper receptacle containing coffee and the lower receptacle containing liquid for infusion with the coffee upon steam being generated in the liquid receptacle after an application of heat. A condensation of the steam in the lower receptacle upon the removal of heat initiates a siphon action to drain the infusion back into the lower receptacle through a filter on a raised portion at the juncture of the siphon tube with the upper receptacle.

It is generally accepted that it is not desirable to boil the coffee bean in the liquid since a substantial amount of tannic acid will be found to be present after such an infusion. It has been found to be desirable to steep the coffee at a temperature just below boiling for a short length of time and the present invention contemplates the boiling of the liquid in the lower receptacle and a subsequent infusion of the liquid with the coffee in the upper receptacle automatically whereafter the infused liquid is filtered back into the lower receptacle for use.

Heretofore, filter cloths have been anchored to a detachable imperforate member having resilient means for securing the member to the vessel in which it is disposed. It has been usual to form the filter anchor member or the resilient member or both of metal which construction in a measure contaminates the coffee because of a chemical reaction with the metal.

The present invention contemplates the provision of a wholly non-metallic construction in so far as those parts are concerned which contact with the liquid, a raised portion being provided at the juncture of the siphon tube with the upper receptacle of the same material on which a filter cloth is disposed. In the embodiment illustrated in the drawing, the raised portion is formed integrally with the upper receptacle and the siphon tube, the raised portion having converging edges when viewed in cross-section so as to provide a means for tying down the filter cloth.

Other objects and advantages will hereinafter be more fully pointed out and for a more complete understanding of the characteristic features of this invention, reference may now be had to the following description when taken together with the accompanying drawing, in which latter:

Figure 1 is a vertical central sectional view of the apparatus embodying the features of this invention;

Fig. 2 is an enlarged fragmentary view of the filter construction illustrated in Figure 1;

Fig. 3 is a perspective view of the filter cloth of Fig. 2; and

Fig. 4 is a fragmentary sectional view of a portion of the filter construction showing a modified form of the filter cloth securing means.

Referring now more particularly to the drawing, the apparatus shown therein comprises an upper coffee receptacle 10 and a lower liquid receptacle 11 having a siphon tube 12 communicating therebetween. All of these elements are preferably formed of glass or other vitreous material. The glass or other material of which the elements are formed is heat resisting in order to prevent cracking thereof due to a rapid expansion or contraction of the glass. Also, it has been found with the use of a non-metallic material, such as glass, that the usual chemical reaction obtained in the making of coffee in a metallic vessel is avoided and thus the taste of the infusion is improved and is made chemically pure.

The lower glass receptacle 11 is preferably formed with a retracted neck portion 13 preferably flared at the upper end in order to facilitate the entrance of associated elements. The upper receptacle 10 is preferably substantially funnel-shaped having an enlarged head end and a reduced stem.

A sealing member 14 in the form of a pure gum rubber or composition gasket surrounds the siphon tube 12 near its juncture with the upper receptacle for engaging the inner periphery of the flared neck 13 to afford a sealed relation between the upper and lower receptacles. The lower end of the tube 12 extending from the upper receptacle extends to a point in close proximity to the base of the lower receptacle 11 in order to prevent the entire displacement of the liquid in the lower receptacle during its operation to prevent a cracking of the glass.

The siphon tube 12 is preferably formed integrally with the upper receptacle 10 and forms a reentrant portion thereinto, the reentrant portion being raised above the lower surface of the receptacle to form an anchoring portion 15 for a filter cloth 16. The reentrant or raised portion is formed by reason of the tube 12 extending into the upper receptacle and being connected thereto by a ring spaced from the side of the tube, the upper end of the ring being connected with the upper end of the tube and the lower end of the ring being connected with the bottom of the upper receptacle. In the embodiment shown in the drawing, the raised portion has inwardly converging edges 17 when viewed in cross section, that is, the edges converge from the upper end of the raised portion to the bottom of the receptacle in order that the outer edge of the filter cloth may be tied down thereover to be held in position thereon. It is, of course, submitted that in lieu of these inwardly converging edges, the lower end of the raised portion may merely be of a smaller diameter than the upper end or may be provided with other suitable means whereby the filter cloth 16 will be prevented from displacement therefrom.

The filter cloth 16, as shown in Fig. 2, comprises a piece of muslin or other similar material, having a pocket on the edge thereof in which a draw string 18 is disposed. When the filter cloth is positioned over the raised portion 15, the draw string 18 is tied tightly over the inwardly converging edges of the raised portion and the filter cloth is prevented from displacement thereon. However, in lieu of a draw string 18, it may be desirable in some instances to insert in the pocket of the filter cloth a coil spring 19 or any other resilient means, such as an elastic band or the like for automatically providing tension against the inwardly converging walls in order to prevent displacement of the filter cloth.

In the operation of the above apparatus, heat is applied to the lower receptacle 11 to heat the liquid therein whereafter when the water comes to a boil steam is generated, the pressure of which forces the water from the lower receptacle through the siphon tube 12 into the upper receptacle where it infuses the coffee therein. All of the water in the lower receptacle will subsequently pass into the upper receptacle with the exception of that amount of water in the lower receptacle beneath the lower end of the siphon tube 12 which is purposely permitted to cover the entire bottom of the receptacle to prevent a cracking of the glass.

The liquid forced into the upper receptacle is slightly below the boiling point and although heat is continued to be supplied to the apparatus in the lower receptacle for an indefinite length of time, still the liquid in the upper receptacle remains just below the boiling point which permits the coffee to steep until all the soluble elements are extracted from the coffee, whereafter the application of heat to the apparatus is discontinued.

As there is now no heat applied to the lower receptacle, what steam is left therein condenses and forms a vacuum which draws the coffee through the filter cloth 16 into the siphon tube 12 and back into the lower receptacle 11. Inasmuch as the raised portion 15 will prevent all of the coffee being drawn from the upper receptacle, the content is minimized by retracting the receptacle in area about the raised portion so that practically all the water will be drawn off leaving but the coffee bean or powder in that portion disposed below the upper surface of the raised portion.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. In a device of the character described, the combination with a lower liquid receptacle portion, of an upper coffee receptacle connected thereto, and a siphon tube formed integrally with said upper receptacle portion and passing into said lower receptacle portion, said tube extending into said upper receptacle and being connected thereto by a ring spaced from the side of said tube, said upper receptacle and said tube together with said connecting ring being of uniform cross-section and said ring having an upper portion of greater outside diameter than a lower portion thereof whereby a filter cloth enveloping said tube end and said ring may be detachably engaged at said smaller diameter.

2. In a device of the character described, the combination with a lower liquid receptacle portion, of an upper coffee receptacle connected thereto, and a siphon tube formed integrally with said upper receptacle portion and passing into said lower receptacle portion, said tube extending into said upper receptacle and being connected thereto by a ring spaced from the side of said tube, said upper receptacle and said tube together with said connecting ring being of uniform cross-section and said ring having inwardly converging edges when viewed in cross-section whereby a filter cloth enveloping said tube end and said ring may be detachably engaged at said smaller diameter.

3. In a device of the character described, the combination with a lower liquid receptacle portion, of an upper coffee receptacle connected thereto, and a siphon tube formed integrally with said upper receptacle portion and passing into said lower receptacle portion, said tube extending into said upper receptacle and being connected thereto by a ring spaced from the side of said tube, said upper receptacle and said tube together with said connecting ring being of uniform cross-section and said ring having an upper portion of greater outside diameter than a lower portion thereof whereby a filter cloth enveloping said tube end and said ring may be detachably engaged at said smaller diameter, the lower portion of said upper receptacle being constricted about said ring to minimize the content of said receptacle at that portion.

VICTOR R. WEAST.